United States Patent
Watanabe (10) Patent No.: US 6,542,272 B1
(45) Date of Patent: Apr. 1, 2003

(54) CONTROL SIGNAL TRANSMISSION METHOD AND APPARATUS FOR OPTICAL TRANSMISSION SYSTEM

(75) Inventor: Seiji Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/255,679

(22) Filed: Feb. 23, 1999

(30) Foreign Application Priority Data

Feb. 24, 1998 (JP) .......................................... 10-041908

(51) Int. Cl.[7] .............................................. H04B 10/00
(52) U.S. Cl. ........................ 359/156; 359/158; 359/181; 359/188; 359/192
(58) Field of Search ................................ 359/156, 158, 359/181, 188, 192

(56) References Cited

U.S. PATENT DOCUMENTS

| | | | | |
|---|---|---|---|---|
| 5,424,861 A | * | 6/1995 | Koning ........................ | 359/156 |
| 5,471,545 A | * | 11/1995 | Negami et al. ................ | 385/1 |
| 5,596,441 A | * | 1/1997 | Sakakibara et al. .......... | 359/192 |
| 5,808,768 A | * | 9/1998 | Tadakuma et al. ........... | 359/156 |
| 5,923,453 A | * | 7/1999 | Yoneyama ................... | 359/177 |
| 5,953,421 A | * | 9/1999 | Townsend ..................... | 380/21 |

FOREIGN PATENT DOCUMENTS

| | | |
|---|---|---|
| JP | 2114742 | 4/1990 |
| JP | 4236527 | 8/1992 |
| JP | 6164515 | 6/1994 |
| JP | 7183871 | 7/1995 |
| JP | 8288910 | 11/1996 |

OTHER PUBLICATIONS

Japanese Office Action in a related application with English translation of relevant portions.

* cited by examiner

Primary Examiner—Leslie Pascal
Assistant Examiner—Dzung Tran
(74) Attorney, Agent, or Firm—Dickstein, Shapiro, Morin & Oshinsky, LLP.

(57) ABSTRACT

The invention provides a control signal transmission method for an optical transmission system by which a control signal having a high signal to noise ratio is transmitted without providing any deterioration in characteristic to the information signal. The control signal transmission method for an optical transmission system is characterized in that, upon transmission of a control signal of the optical transmission system, an optical signal modulated with an information signal is polarization modulated with the control signal, and the polarization state of the optical signal is varied with the control signal to obtain a modulated optical signal and the control signal is transmitted with the modulated optical signal. The present invention also provides a control signal reception method for an optical transmission system, which is characterized in that a modulated optical signal produced by polarization modulating an optical signal modulated with an information signal with a control signal and varying the polarization state of the modulation optical signal with the control signal is received, and the polarization modulated control signal is extracted by means of a polarizer.

10 Claims, 12 Drawing Sheets

CONTROL SIGNAL TRANSMISSION METHOD AND APPARATUS FOR OPTICAL TRANSMISSION SYSTEM

BACKGROUND OF THE INVENTION

1. Field of the Invention

This invention relates to a long distance optical transmission system in which an erbium-doped fiber amplifier is used, and more particularly to a control signal transmission method and apparatus for a long distance optical transmission system.

2. Description of the Relates Art

Figure 1:
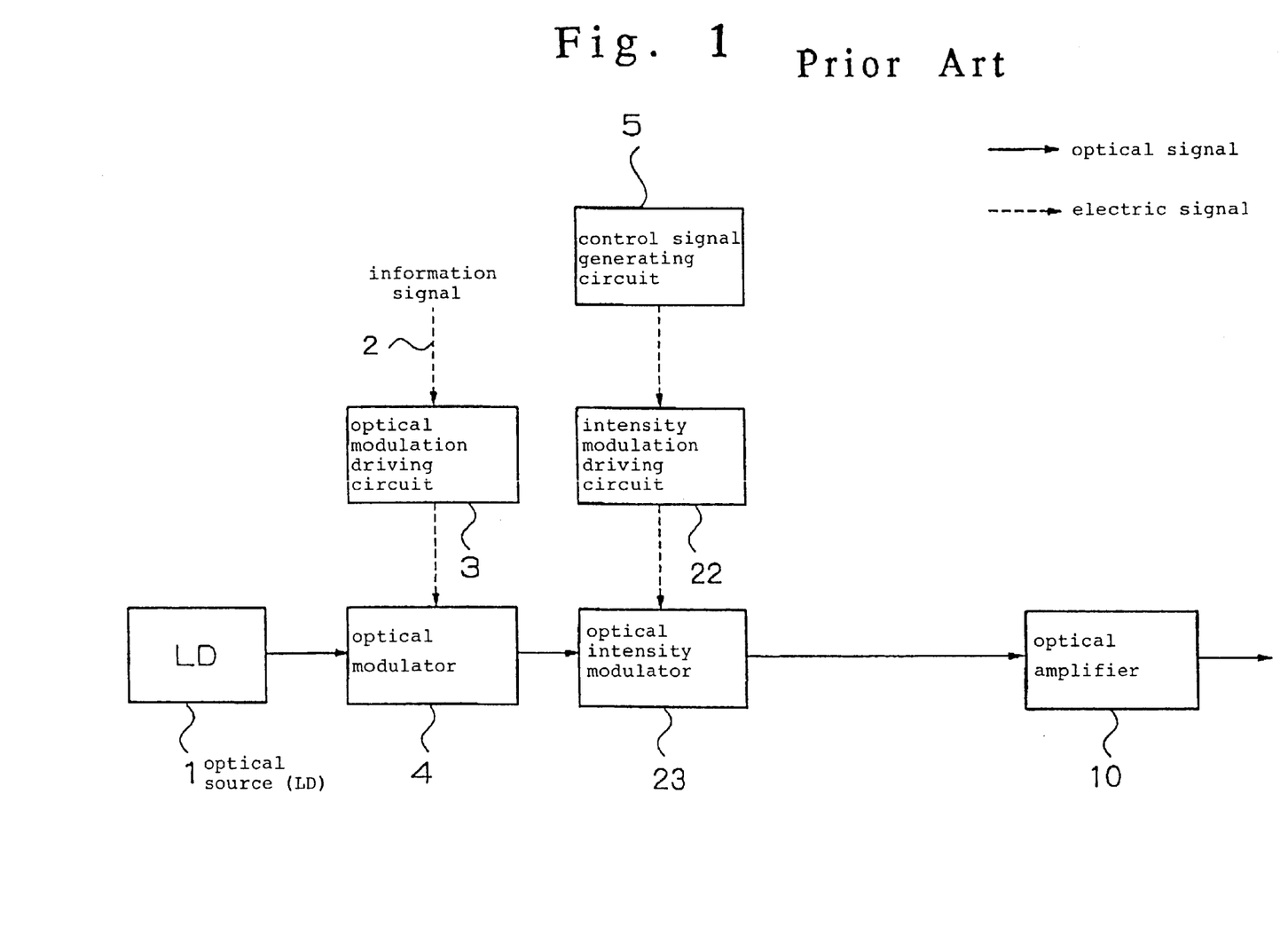
FIG. 1 is a block diagram showing a construction of a control signal transmission apparatus of a transmitter of a terminal or repeater equipment of a conventional optical transmission system.
Figure 2:
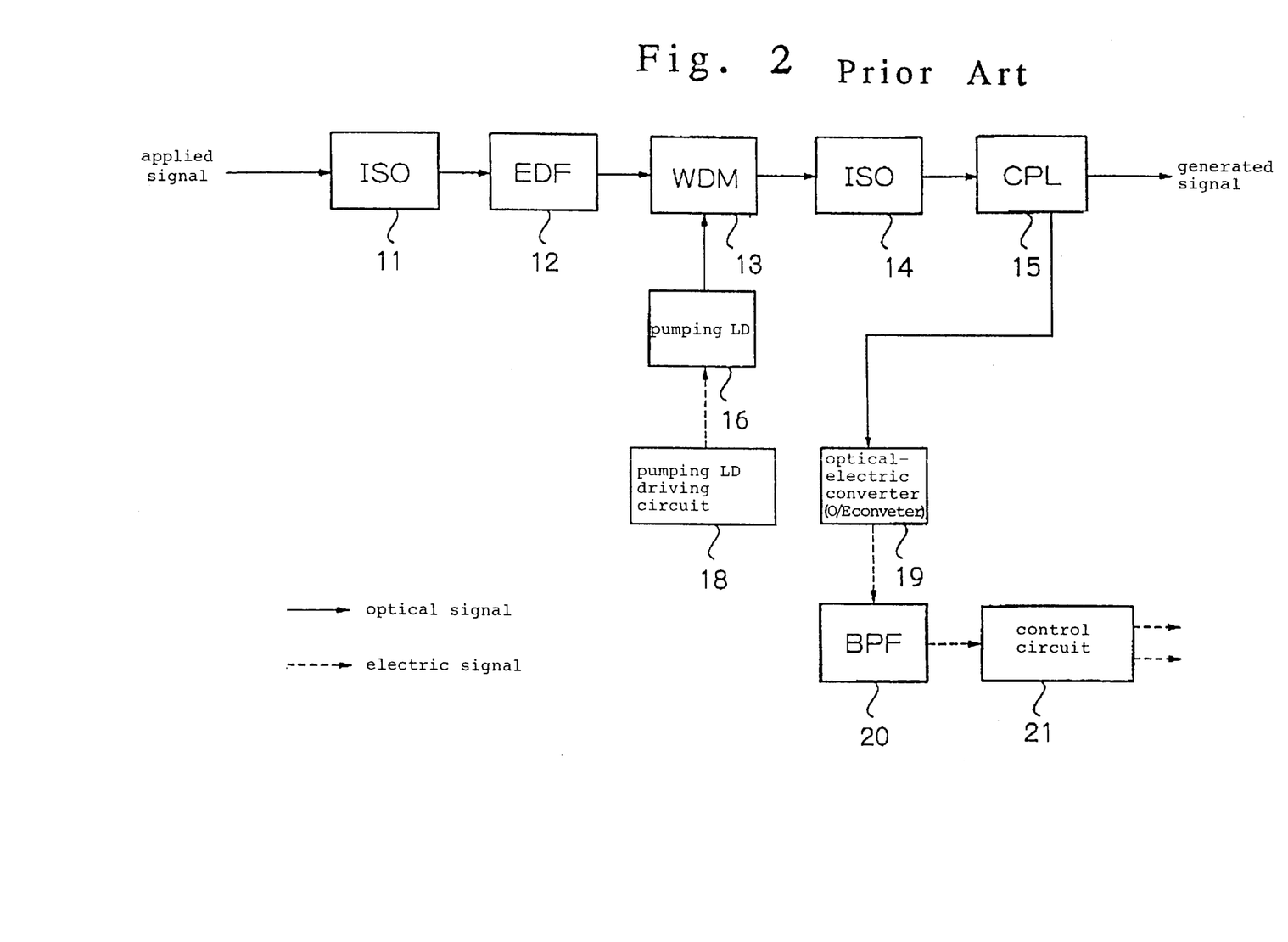
FIG. 2 is a block diagram showing a construction of a control signal transmission apparatus of a receiver of a terminal or repeater equipment of the conventional optical transmission system.
Figure 3:
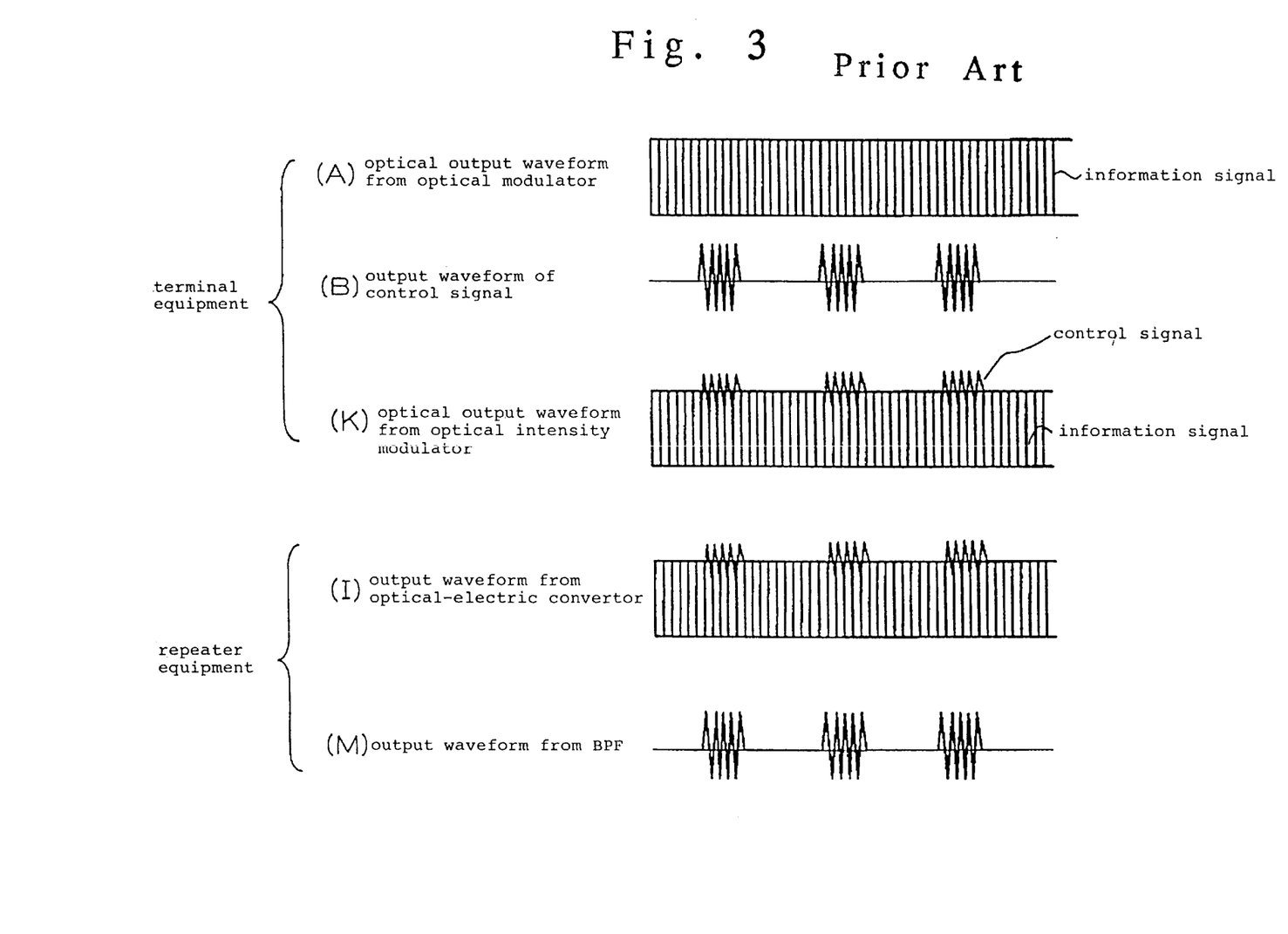
FIG. 3 is a waveform diagram showing waveforms of several components for explaining operation of the terminal or repeater equipment of the conventional optical transmission system.

Conventionally, in a long distance optical transmission system in which an erbium-doped fiber amplifier is used, it is necessary for a terminal equipment to transmit a control signal to a repeater equipment in order to perform various controls and supervision of the repeater equipment. A transmission method for a control signal is based on optical intensity modulation of an optical signal modulated with an information signal further with the control signal. FIG. 1 shows an example of a terminal equipment. In the terminal equipment shown, laser light generated from optical source (LD) 1 is modulated in accordance with an information signal by optical modulator 4 and is further modulated in accordance with a control signal generated from control signal generating circuit 5 by optical intensity modulator 23. Optical amplifier 10 is used to amplify an optical output level which exhibits a drop. FIG. 2 shows an example of a repeater equipment. An optical signal applied to the repeater equipment is amplified by erbium-doped fiber amplifier (EDF) 12 and branched by optical coupler (CPL) 15. One of the two branched optical signals is generated as an output signal while the other branched optical signal is applied to control circuit 21 after it passes through band pass filter (BPF) 20. Optical signals and electric signals of several components are illustrated in FIG. 3. In particular, with regard to the terminal equipment, (A) of FIG. 3 shows an optical output waveform of a modulated information signal of optical modulator 4, (B) shows an output waveform of a control signal of intensity modulation driving circuit 22, and (K) shows an optical output waveform of optical intensity modulator 23, and with regard to the repeater equipment, (L) of FIG. 3 shows an output waveform of optical-electric converter (O/E converter) 19, and (M) shows a waveform of a control signal from BPF 20.

The prior art described above has the following problems. The prior art has a problem in that, if the modulation degree of a control signal is raised in order to amplitude modulate an information signal with a control signal as seen in FIG. 3, this causes deterioration of the information signal.

The prior art has another problem in that, in order to suppress deterioration of an information signal, the modulation degree must be set low, and consequently, the amplitude of a control signal received by the repeater equipment becomes so small that a sufficient signal to noise ratio of the control signal cannot be obtained.

SUMMARY OF THE INVENTION

It is an object of the present invention to provide a method and apparatus by which a control signal having a high signal to noise ratio is transmitted without providing any deterioration in characteristic to the transmission signal by modulating a polarization state of an optical signal with the control signal and transmitting the modulated optical signal.

According to an aspect of the present invention, there is provided a control signal transmission method for an optical transmission system, characterized in that an optical signal modulated with an information signal is polarization modulated with a control signal, and the polarization state of the polarization modulation optical signal is varied in synchronism with the control signal to obtain a modulated optical signal and the control signal is transmitted with the modulated optical signal.

According to another aspect of the present invention, there is provided a control signal reception method for an optical transmission system, characterized in that a modulated optical signal produced by polarization modulating an optical signal modulated with an information signal with a control signal and varying the polarization state of the polarization modulated optical signal in synchronism with the control signal is received, and the polarization modulated control signal is extracted by means of a polarizer.

According to a further aspect of the present invention, there is provided a control signal transmission apparatus for a transmission terminal or a repeater equipment of an optical transmission system which multiplexes a modulated optical signal with a control signal, characterized in that it comprises a first polarization modulator for polarization modulating an optical multiplex signal generated from an optical coupler, which multiplexes a plurality of optical signals modulated with information signals, with a control signal, and a second polarization modulator for varying the polarization state of the polarization modulated optical signals in synchronism with the control signal and transmitting resulting modulated optical signals.

According to a still further aspect of the present invention, there is provided a control signal transmission apparatus for a reception terminal or a repeater equipment of an optical transmission system which multiplexes a modulated optical signal with a control signal, characterized in that it comprises a polarizer which applies a received modulated optical signal and extracts a polarization modulated control signal from the received modulated optical signal, and the optical signal obtained by the polarizer is converted into an electric signal and the control signal is generated through a band-pass filter.

The first advantage of the present invention is that a control signal can be superposed and transmitted together with an information signal without any characteristic deterioration of the information signal. This is because, since the polarization state of an optical signal is modulated with the control signal, the intensity of the optical signal is not varied.

The second advantage of the present invention is that a repeater equipment can receive a control signal of a high signal to noise ratio by means of a simple circuit formed by adding only a polarizer to a conventional circuit. This originates from the control of the present invention that the polarization modulation state of the optical signal is made coincide with the polarization surface of the polarizer by the second polarization modulator so that the output amplitude of the control signal may be maximized.

DESCRIPTION OF THE PREFERRED EMBODIMENTS

In the following, embodiments of a control signal transmission method and apparatus for an optical transmission system of the present invention are described in detail with reference to the drawings.

Figure 4:
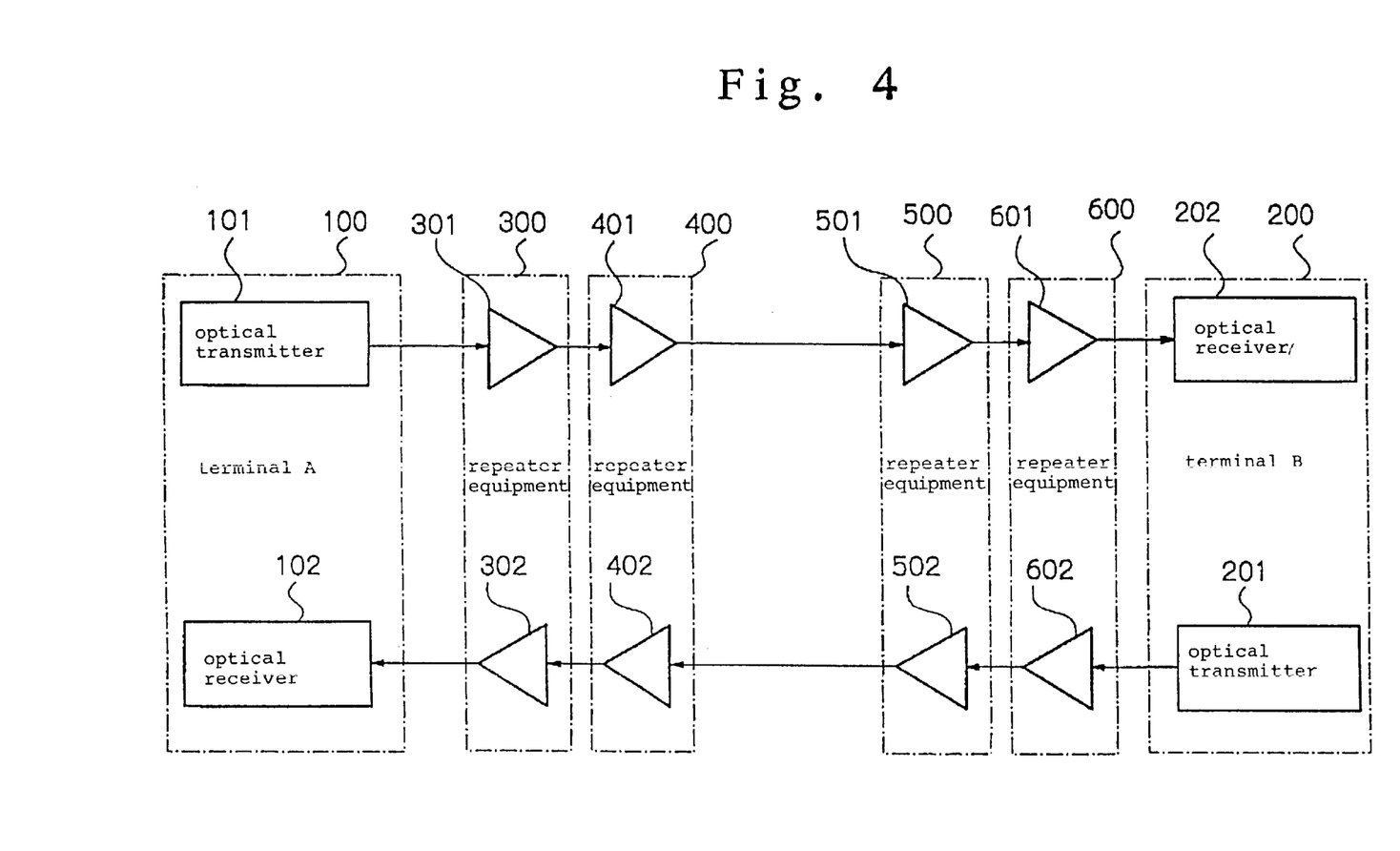
FIG. 4 is a system diagram of a long distance optical transmission system to which a control signal transmission apparatus for an optical transmission system of the present invention is applied.
Figure 5:
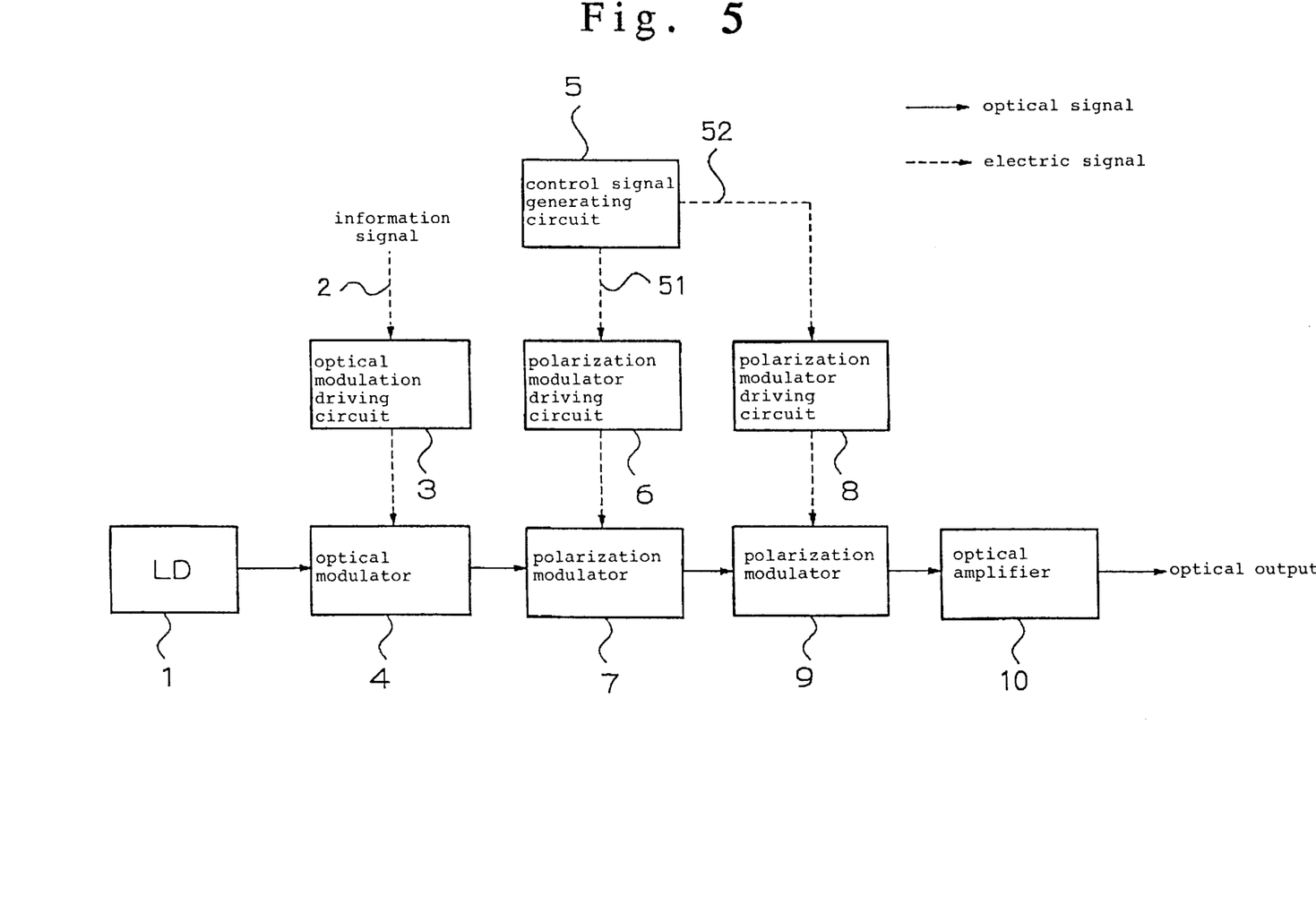
FIG. 5 is a block diagram showing a construction of a control signal transmission apparatus of a transmitter of a transmission terminal or repeater equipment of the optical transmission system of the present invention.

FIG. 4 is a system diagram of a long distance optical transmission system to which a control signal transmission apparatus for an optical transmission system of the present invention is applied; FIG. 5 is a block diagram showing a construction of a control signal transmission apparatus of a transmitter of a transmission terminal or repeater equipment of the optical transmission system of the present invention; and FIG. 6 is a block diagram showing a construction of a control signal transmission apparatus of a receiver of a reception terminal or repeater equipment of the optical transmission system of the present invention.

Referring to FIG. 4, the optical transmission system includes n repeater equipments 300 to 600 interposed between terminal 100 and another terminal 200. Terminal 100 includes optical transmitter 101 and optical receiver 102; terminal 200 includes optical transmitter 201 and optical receiver 202, and each of repeater equipments 300 to 600 includes ascending and descending repeaters 301 and 302, . . . , or repeaters 601 and 602.

Figure 6:
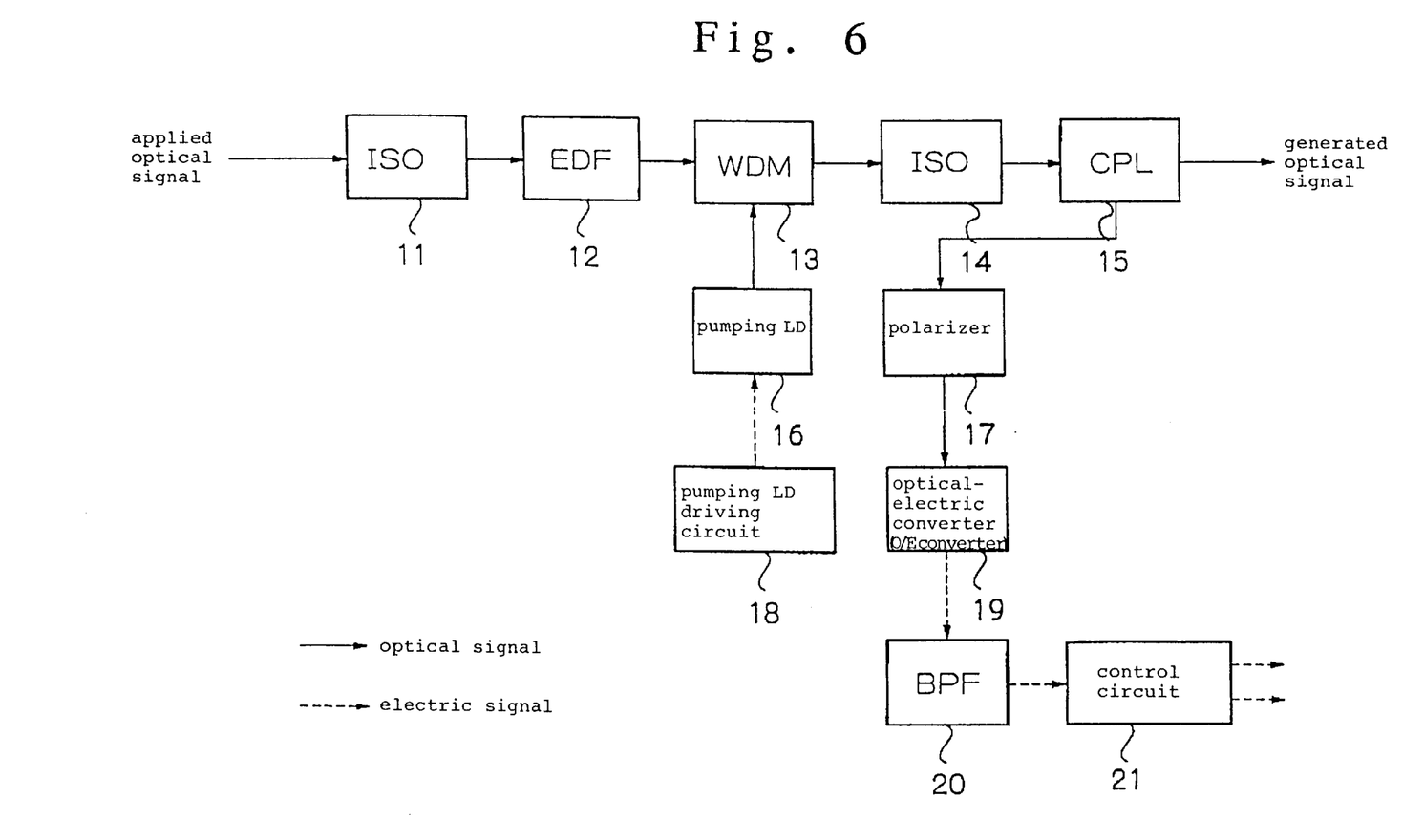
FIG. 6 is a block diagram showing a construction of a control signal transmission apparatus of a receiver of a reception terminal or repeater equipment of the optical transmission system of the present invention.

In the control signal transmission apparatus of one system in the optical transmission system of the present invention, for example, a control signal transmission apparatus of FIG. 5 is provided in optical transmitter 101 of terminal 100, and a control signal transmission apparatus of FIG. 6 is provided in repeater 301 of repeater equipment 300 or optical receiver 202 of terminal 200.

Referring to FIG. 5, the control signal transmission apparatus provided in optical transmitter 101 of terminal 100 includes optical source (LD) 1 for generating an optical signal, optical modulation driving circuit 3 for generating a driving signal for modulating the optical signal in accordance with information signal 2, optical modulator 4 for modulating the optical signal with the driving signal, control signal generating circuit 5 for generating control signals, polarization modulator driving circuit 6 for modulating the polarization surface of the modulated optical signal in accordance with control signal 51 generated from control signal generating circuit 5, polarization modulator 7, polarization modulator driving circuit 8 for modulating the polarization surface of the optical signal with control signal 52 synchronized with control signal 51, polarization modulator 9, and optical amplifier 10 which amplifies the optical signal level, which has been dropped by polarization modulator 7 and polarization modulator 9, and generates the amplified optical signal.

Referring to FIG. 6, the control signal transmission apparatus provided in repeater 301 of repeater equipment 300 or optical receiver 202 of terminal 200 includes optical isolator (ISO) 11 and erbium-doped fiber amplifier (EDF) 12 for amplifying an optical signal transmitted from a terminal equipment, wavelength division multiplex coupler (WDM) 13 for coupling the amplified optical signal and pumping light, pumping LD 16, pumping LD driving circuit 18, optical isolator (ISO) 14, optical coupler (CPL) 15, polarizer 17 for receiving a branched optical signal and extracting only an optical component of the control signal which coincides with the polarization surface thereof, optical-electric converter (O/E converter) 19 for converting the optical signal into an electric signal, band pass filter (BPF) 20, and control circuit 21 for generating a control signal.

Erbium-doped fiber amplifier (EDF) 12, for example, an erbium-doped fiber, amplifies an optical signal applied thereto with pumping light from pumping optical source (pumping LD) 16 having passed through wavelength division multiplex coupler (WDM) 13.

Now, operation of the control signal transmission apparatus provided in optical transmitter 101 of terminal 100 of the optical transmission system of the present invention is described with reference to FIGS. 5 and 7.

An optical signal generated from optical source (LD) 1 is first modulated in accordance with an information signal by optical modulation driving circuit 3 and optical modulator 4. Then, the polarization surface of the optical signal is modulated by polarization modulator driving circuit 6 and polarization modulator 7 in accordance with control signal 51 generated from control signal generating circuit 5. Further, the polarization surface of the optical signal is modulated by polarization modulator driving circuit 8 and polarization modulator 9 with control signal 52 synchronized with control signal 51 and having a longer period. Finally, the optical signal level which has been dropped by the modulators in the stages is amplified by optical amplifier 10, and a resulting optical signal is generated.

Figure 7:
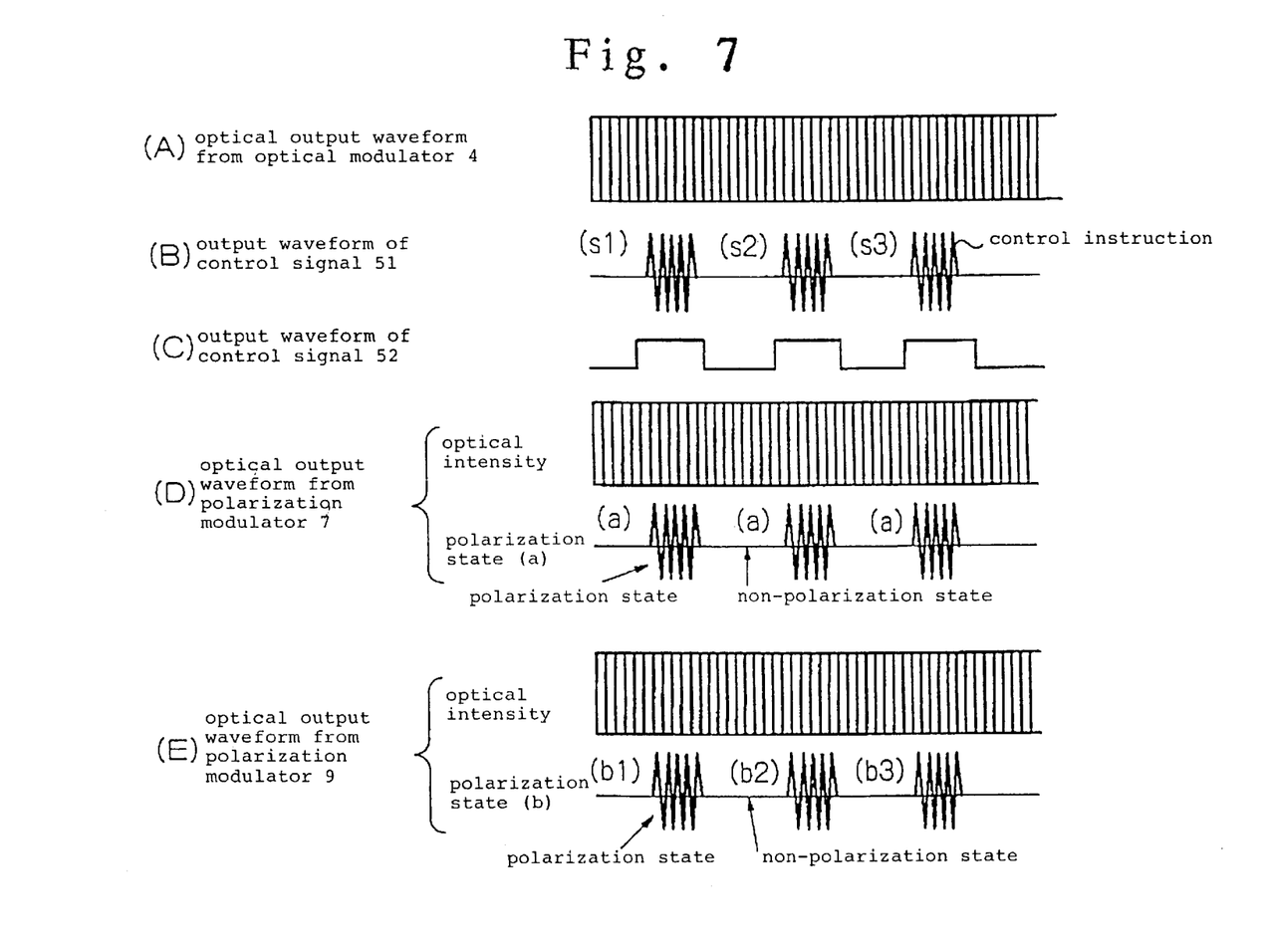
FIG. 7 is a waveform diagram showing waveforms of several components for explaining operation of the control signal transmission apparatus of FIG. 5.

Referring to FIG. 7, (A) shows an optical output waveform of optical modulator 4 from which an optical signal modulated with an information signal is generated, and (B) shows a waveform of control signal 51 which shows an example wherein the control signal which is formed from one control instruction is transmitted three times like s1, s2 and s3. (C) shows a waveform of control signal output 52 wherein a control signal is generated three times in synchronism with control signals s1, s2 and s3. (D) shows an optical output waveform of polarization modulator 7 whose polarization state exhibits that it is modulated in same polarization modulation state (a) all three times in accordance with control signal 51. In this instance, the optical intensity does not exhibit any variation. (E) shows an optical output waveform of polarization modulator 9 whose polarization state exhibits that it is modulated while polarization modulation state (b) varies like b1, b2 and b3 in accordance with control signal 52.

Next, operation of the control signal transmission apparatus which is provided in repeater 301 of repeater equipment 300 or optical receiver 202 of terminal 200 of the optical transmission system of the present invention is described with reference to FIGS. 6 and 8.

In an embodiment of a repeater equipment which employs erbium-doped fiber amplifier (EDF) 12, an optical signal transmitted from a terminal equipment is generated after it passes through optical isolator 11, erbium-doped fiber amplifier (EDF) 12, wavelength division multiplex coupler (WDM) 13, optical isolator 14 and optical coupler (CPL) 15. Erbium-doped fiber amplifier 12, for example, an erbium doped fiber, amplifies the applied optical signal with pumping light from pumping optical source (pumping LD) 16. Wavelength division multiplex coupler (WDM) 13 couples the optical signal and the pumping light. The optical signal branched by optical isolator (ISO) 14 is applied to polarizer 17, by which only an optical component of the polarization modulated optical signal coincident with the polarization surface of polarizer 17 is extracted with a control signal. Then, the optical signal is converted into an electric signal by optical-electric converter 19, and the electric signal is applied to control circuit 21 after it passes through band pass filter 20.

Figure 8:
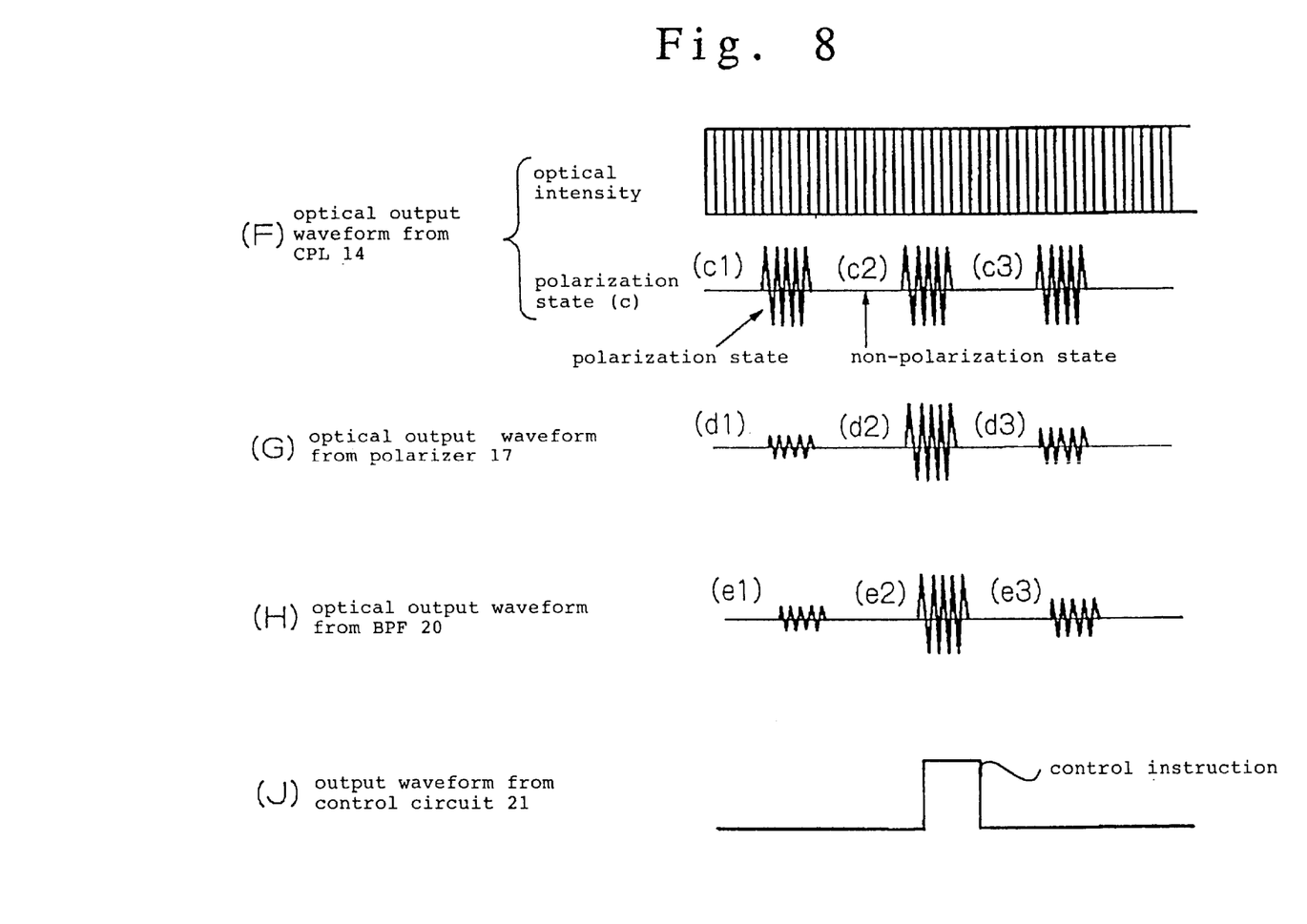
FIG. 8 is a waveform diagram showing waveforms of several components for explaining operation of the control signal transmission apparatus of FIG. 6.

Referring to FIG. 8, (F) shows an output waveform of optical isolator 14 when an optical signal transmitted from a terminal equipment and branched by optical isolator 14 is generated in such polarization modulation states as c1, c2 and c3 from optical isolator 14 because the polarization state of the optical signal is varied by the transmission line. It is assumed that c1 exhibits a state wherein the optical signal does not coincide with the polarization plane of polarizer 17; c2 exhibits another state wherein the optical signal coincides well with the polarization plane of polarizer 17; and c3 exhibits an intermediate state between the two stages. Since the polarization state of the optical transmission signal in the transmission line always varies slowly, the states of c1 to c3 always exhibit a very slow variation with respect to time. The term "slow" signifies that the rate of the variation is low with respect to the rate of the control signal. (G) shows an optical output waveform of polarizer 17 whose amplitude is minimum in polarization state c1, maximum in polarization state c2, and medium in polarization state c3. (H) shows an output waveform of band pass filter 20 which generates a signal from which noise components other than a control signal frequency component are removed. The noise components in this instance are the information signal and spontaneous emission noise (ASE) of the optical amplifier. (J) shows an output waveform of control circuit 21 which receives the optical signal regularly only in polarization state d2 in which the band pass filter output exhibits its maximum, but does not receive it in the other polarization states d1, d3 because the amplitude is small.

In this manner, in the control signal transmission apparatus provided in repeater 301 of the repeater equipment, since the polarization state of an optical signal in the transmission line varies slowly, there is the possibility that the polarization state of the optical signal may come out of coincidence with the polarization surface of the polarizer, which disables the reception of the optical signal. In order to eliminate this, polarization modulator 9 has a function of varying the polarization state for each control signal block like b1, b2, b3 as seen from polarization state (b) of FIG. 7 to produce a polarization state coincident with the polarization surface of polarizer 17.

From an actually conducted examination, a result that the polarization surface of an optical signal and the polarization surface of a polarizer can be made coincide with each other by varying the polarization state approximately three to six times has been obtained.

Next, another embodiment of the present invention is described with reference to the drawings.

Figure 9:
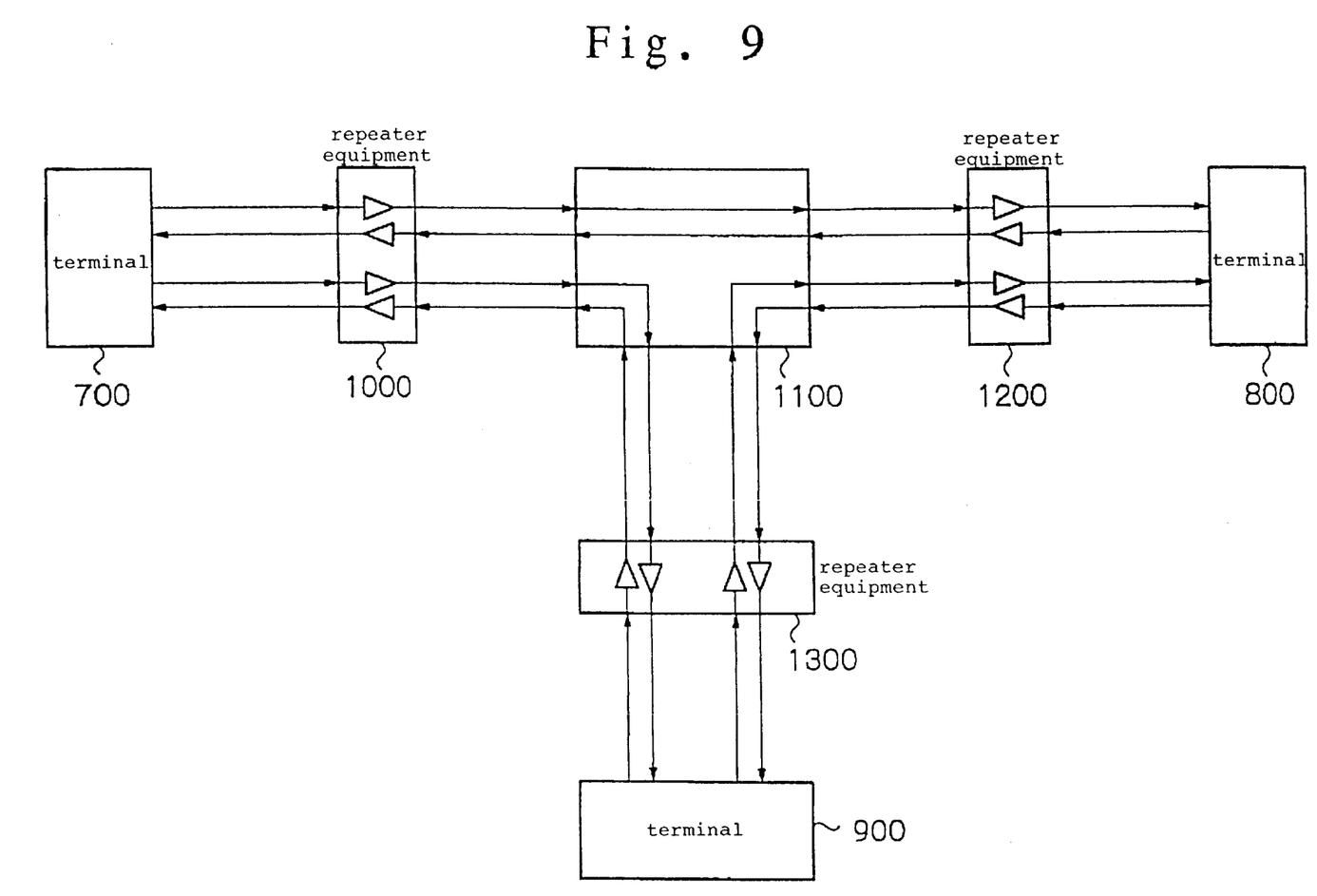
FIG. 9 is a system diagram of another long distance optical transmission system to which the control signal transmission apparatus for an optical transmission system of the present invention is applied.

FIG. 9 is a system diagram of another long distance optical transmission system to which the control signal transmission apparatus for an optical transmission system of the present invention is applied. The present optical transmission system includes optical coupler equipment 1100 which branches an optical signal midway of a transmission line so as to be distributed to a plurality of terminal equipments. The control signal transmission apparatus of the present invention can naturally be used in a terminal equipment and a repeater equipment of an optical transmission system which includes such optical coupler equipment 1100 as just described.

Figure 10:
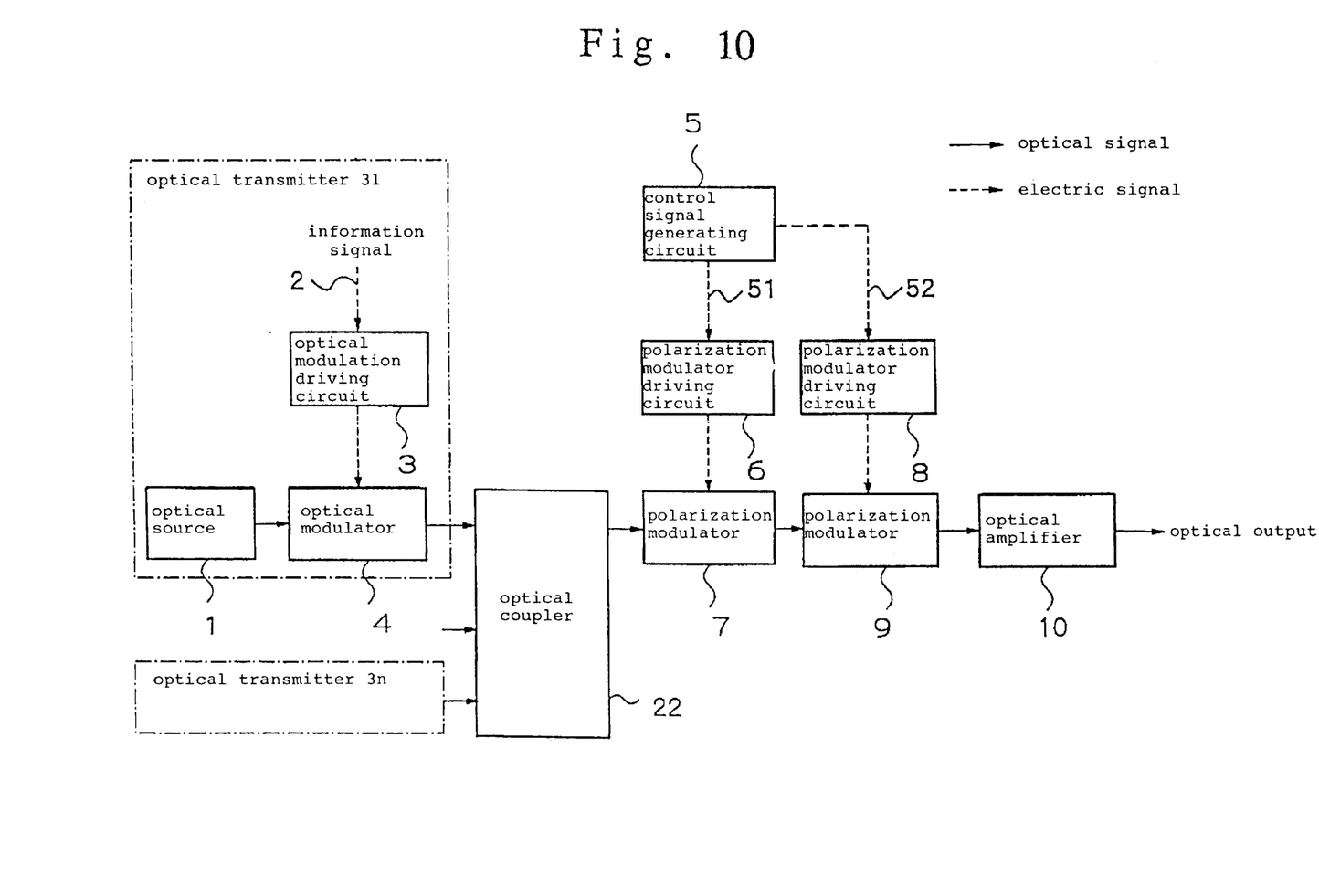
FIG. 10 is a block diagram showing a construction of a control signal transmission apparatus of a first another embodiment of a transmitter of a transmission terminal or repeater equipment of the optical transmission system of the present invention.

FIG. 10 is a block diagram showing a construction of a control signal transmission apparatus of a first another embodiment of a transmitter of a transmission terminal or repeater equipment of the optical transmission system of the present invention.

The control signal transmission apparatus of the first another embodiment includes n optical transmitters 31 to 3n each including optical source (LD) 1 for generating an optical signal, optical modulation driving circuit 3 for generating a driving signal for modulating the optical signal in accordance with information signal 2, and optical modulator 4 for modulating the optical signal with the driving signal, optical coupler 22 for optically wavelength multiplexing the n optical transmitters, control signal generating circuit 5 for generating control signals, polarization modulator driving circuit 6 for modulating the polarization surface of the modulated optical signal in accordance with control signal 51 generated from control signal generating circuit 5, polarization modulator 7, polarization modulator driving circuit 8 for modulating the polarization surface of the optical signal with control signal 52 synchronized with control signal 51 and having a longer period, polarization modulator 9, and optical amplifier 10 for amplifying the optical signal level which has been dropped by polarization modulator 7 and polarization modulator 9 and generating the optical signal of the amplified level.

The plurality of optical transmitters 31 to 3n of the present control signal transmission apparatus modulate optical signals generated from optical sources (LD) 1 and having different wavelengths from one another in accordance with respective information signals each by means of optical modulation driving circuit 3 and optical modulator 4. The optical signals of the n optical transmitters are optically wavelength multiplexed by optical coupler 22. Then, the polarization surface of the optical signal from optical coupler 22 is modulated by polarization modulator driving circuit 6 and polarization modulator 7 in accordance with control signal 51 generated from control signal generating circuit 5. Further, the polarization plane of the optical signal is modulated by polarization modulator driving circuit 8 and polarization modulator 9 with control signal 52 synchronized with control signal 51 and having a longer period. Finally, the optical signal level which has been dropped by the modulators in the preceding stages is amplified by optical amplifier 10, and the optical signal having the amplified level is generated from optical amplifier 10.

In the control signal transmission apparatus which has optical coupler 22, optical signals modulated with n information signals 2 of optical transmitters 31 to 3n are coupled by optical coupler 22. In the, control signal transmission method, n optical signals are multiplexed first, and then a resulting optical signal is polarization modulated with a control signal.

Figure 11:
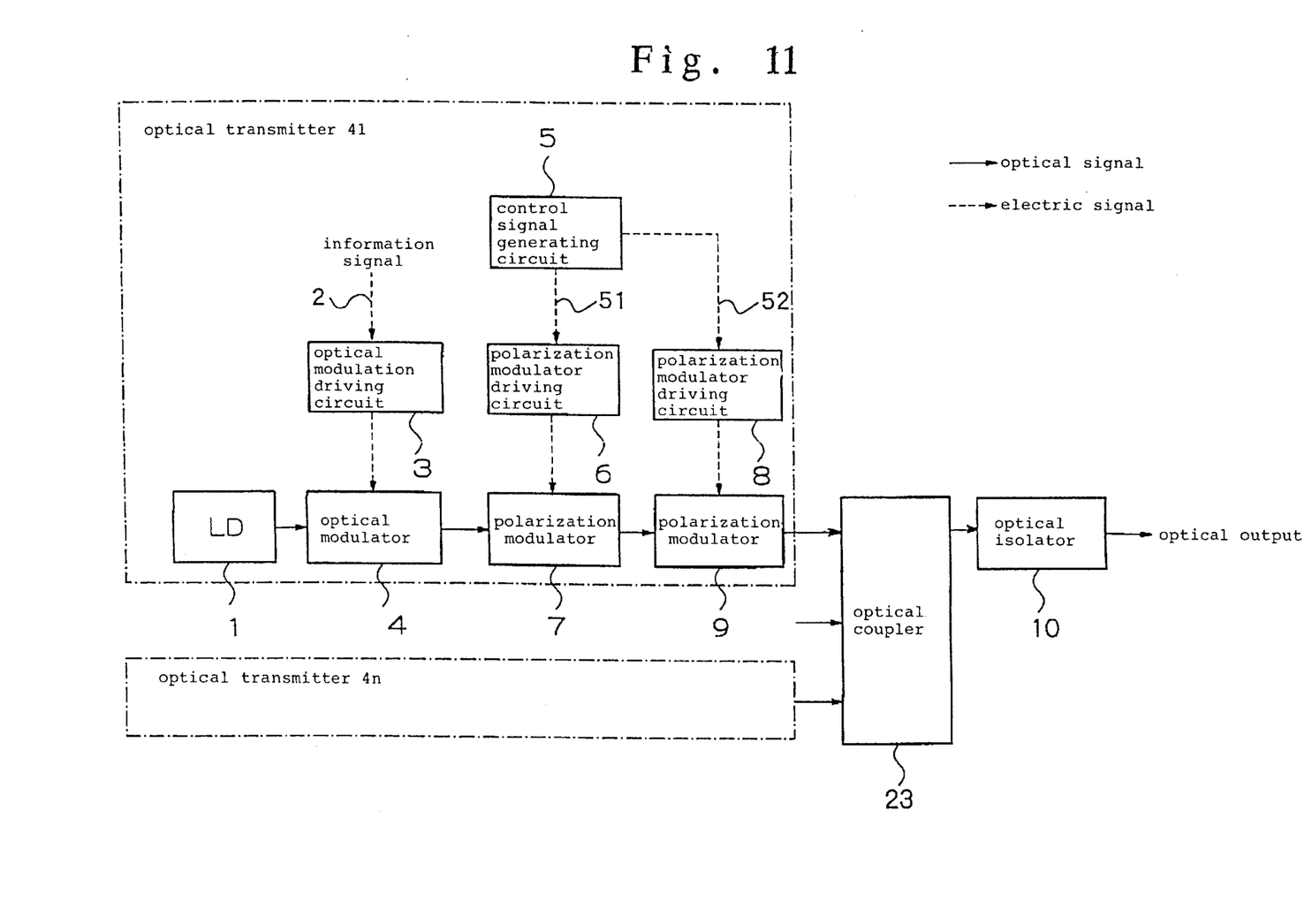
FIG. 11 is a block diagram showing a construction of a control signal transmission apparatus of a second another embodiment of a transmitter of a transmission terminal or repeater equipment of the optical transmission system of the present invention.

FIG. 11 is a block diagram showing a construction of a control signal transmission apparatus of a second another embodiment of a transmitter of a transmission terminal or repeater equipment of the optical transmission system of the present invention.

The present control signal transmission apparatus includes optical transmitters 41 to 4n each including optical source (LD) 1 for generating an optical signal, optical modulation driving circuit 3 for generating a driving signal for modulating the optical signal in accordance with information signal 2, optical modulator 4 for modulating the optical signal with the driving signal, control signal generating circuit 5 for generating control signals, polarization modulator driving circuit 6 and polarization modulator 7 for modulating the polarization surface of the modulated optical signal in accordance with control signal 51 generated from control signal generating circuit 5, and polarization modulator driving circuit 8 and polarization modulator 9 for modulating the polarization surface of the optical signal with control signal 52 synchronized with control signal 51, optical coupler 23 for optically wavelength multiplexing the n optical signals, and optical amplifier 10 for amplifying the optical signal in an attenuated state.

Figure 12:
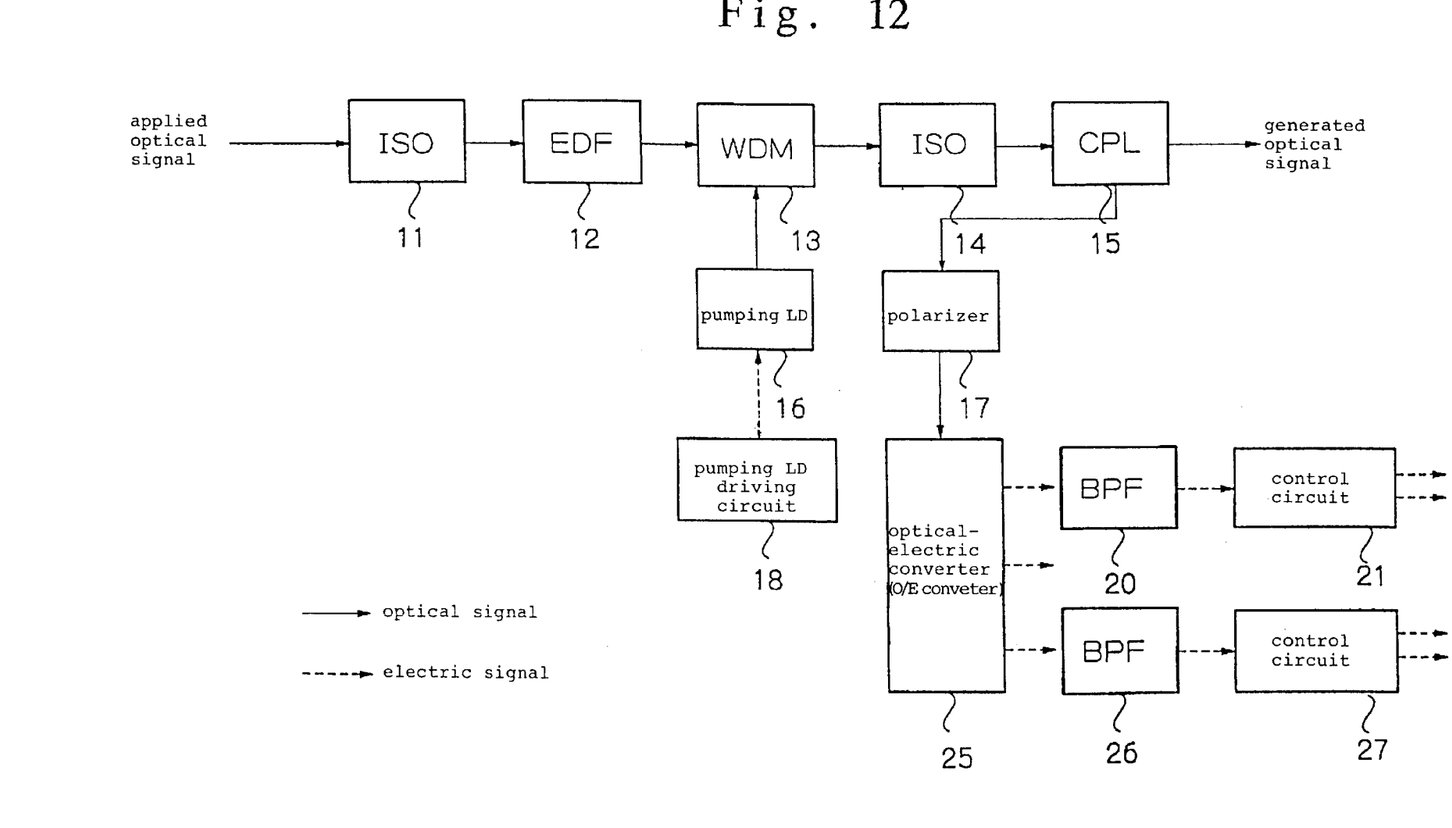
FIG. 12 is a block diagram showing a construction of a control signal transmission apparatus of a receiver of a reception terminal or repeater equipment of a second another embodiment corresponding to the control signal transmission apparatus of FIG. 11.

FIG. 12 is a block diagram showing a construction of a control signal transmission apparatus of a receiver of a reception terminal or repeater equipment of a second another embodiment corresponding to the control signal transmission apparatus of FIG. 11. The apparatus is a repeater equipment corresponding to the terminal equipment of FIG. 11. The present control signal transmission apparatus includes optical isolator (ISO) 11 and erbium-doped fiber amplifier (EDF) 12 for amplifying an optical signal transmitted from a terminal equipment, wavelength division multiplex coupler (WDM) 13 for coupling the amplified optical signal and pumping light, optical isolator (ISO) 14, optical coupler (CPL) 15, polarizer 17 for applying one of branched optical signals and extracting only n optical components of the control signal which have a polarization surface thereof, optical-electrical converter (O/E converter) 25 for applying the n optical signals, n band pass filters 20, 26 corresponding to the individual outputs from optical-electrical converter 25, and n control circuits 21, 27 for generating the individual control signals.

Further, the present invention can be applied also where a control signal receiving circuit having a same construction as that of a repeater equipment is incorporated in a terminal equipment on the reception side, and also transmission of a control signal between terminal equipments is possible.

As a modulation method for a control signal in the present invention, in addition to amplitude modulation, also frequency modulation, phase modulation and so forth can be applied to a control signal transmission system, and the applicable modulation method is not limited to a particular modulation method.

The control signal transmission method and apparatus for an optical transmission system of the present invention do not give rise to characteristic deterioration of an information signal since it does not involve an intensity variation of an optical signal. Further, a repeater equipment can demodulate, by addition only of a polarizer, a control signal of a high signal to noise ratio when compared with a conventional repeater equipment.

What is claimed is:

1. A control signal transmission method for an optical transmission system, comprising the steps of:

polarization modulating an optical signal modulated with an information signal with a control signal to generate a first polarization modulated optical signal; and varying the polarization state of the first polarization modulated optical signal in synchronism with the control signal to obtain a second polarization modulated optical signal and transmitting the second polarization modulated optical signal.

2. A control signal reception method for an optical transmission system, comprising the steps of:

receiving a second polarization modulated optical signal, the second modulated optical signal produced by:

modulating an optical signal with an information signal to produce a modulated optical signal;

polarization modulating the modulated optical signal with a control signal to generate a first polarization modulated optical signal; and polarization modulating the first polarization modulated optical signal in synchronism with the control signal to generate a second polarization modulated optical signal; and extracting the control signal from the second polarization modulated control signal by means of a polarizer.

3. A control signal transmission method for an optical transmission system, comprising the steps of:

polarization modulating an optical signal modulated with an information signal with a control signal to generate a first polarization modulated optical signal;

varying the polarization state of the first polarization modulated optical signal in synchronism with the control signal to obtain a second polarization modulated optical signal, and transmitting the second polarization modulated optical signal;

receiving the second polarization modulated optical signal and applying the received second polarization modulated optical signal to a polarizer;

extracting an optical control signal from the second polarization modulated optical signal using said polarizer;

converting the optical control signal into an electric signal; and generating the control signal from said electric signal by passing said electric signal through a band-pass filter.

4. A control signal transmission apparatus for an optical transmission system, comprising:

a first polarization modulator that polarization modulates an optical signal modulated with an information signal with a control signal to generate a first polarization modulated optical signal;

a second polarization modulator that varies the polarization state of the first polarization modulated optical signal in synchronism with the control signal to generate a second polarization modulated optical signal and transmits the second polarization modulated optical signal; and a polarizer that receives the second polarization modulated optical signal and extracts the control signal therefrom.

5. A control signal transmission apparatus for a transmission terminal of an optical transmission system that multiplexes a plurality of modulated optical signals with a control signal, the control signal transmission apparatus comprising:

a first polarization modulator that polarization modulates an optical multiplex signal generated from an optical coupler, the first polarization modulator multiplexing a plurality of optical signals modulated with information signals with a control signal to provide first polarization modulated optical signals; and a second polarization modulator that varies the polarization state of the first polarization modulated optical signals in synchronism with the control signal to generate second polarization modulated optical signals, and transmits the second polarization modulated optical signals.

6. A control signal transmission apparatus for a reception terminal of an optical transmission system that multiplexes an optical signal with a control signal, the control signal transmission apparatus comprising:

an optical signal receiver;

a polarizer that extracts a polarization modulated optical control signal from the received optical signal;

an optical-electric converter that converts said polarization modulated optical control signal into an electric signal; and a band-pass filter through which the electric signal is passed to obtain the control signal.

7. A control signal transmission apparatus for a transmission terminal of an optical transmission system that multiplexes an optical signal with a control signal, the control signal transmission apparatus comprising:

a plurality of optical transmitters including first polarization modulators that polarization modulate optical signals modulated with information signals with a control signal to generate first polarization modulated optical signals and second polarization modulators that vary the polarization states of the first polarization modulated optical signals in synchronism with the control signal to generate second polarization modulated optical signals and that transmit the second polarization modulated optical signals; and an optical coupler that multiplexes said plurality of optical transmitters.

8. A control signal transmission apparatus for a reception terminal of an optical transmission system that multiplexes an optical signal with a control signal, the control signal transmission apparatus comprising:

a modulation multiplexed optical signal receiver;

a polarizer that receives the modulated multiplexed optical signal and extracts a plurality of polarization modulated optical control signals therefrom; and means for converting the plurality of polarization modulated optical control signals into a plurality of electric signals and passing the plurality of electric signals through a plurality of band-pass filters to obtain the plurality of control signals.

9. A control signal transmission apparatus for a repeater equipment of an optical transmission system that mulitplexes an optical signal with a control signal, the control signal transmission apparatus comprising:

a transmitter including an optical coupler that multiplexes a plurality of optical signals modulated with information signals, a first polarization modulator that polarization modulates an optical multiplex signal generated from said optical coupler with a control signal to generate a first polarization modulated multiplexed optical signal, and a second polarization modulator that varies the polarization state of the first polarization modulated multiplexed optical signal in synchronism with the control signal and transmits the second polarization resulting modulated multiplexed optical signal; and a receiver that receives the second polarization modulated multiplexed optical signal, a polarizer that extracts a polarization modulated optical control signal from the received second polarization modulated optical signal, an optical-electric converter that converts the polarization modulated optical control signal obtained by said polarizer into an electric signal, and a band-pass filter through which the electric signal is passed to generate the control signal.

10. A control signal transmission apparatus for a repeater equipment of an optical transmission system that multiplexes a modulated optical signal with a control signal, the control signal transmission apparatus comprising:

a transmitter including a plurality of optical transmitters including first polarization modulators that polarization modulate optical signals modulated with information signals with respective control signals to generate a plurality of first polarization modulated optical signals and second polarization modulators that vary the polarization states of the first polarization modulated optical signals in synchronism with the respective control signals to generate a plurality of second polarization modulated optical signals and transmit the second polarization modulated optical signals and an optical coupler that multiplexes said plurality of optical transmitters to generate an output optical signal; and a receiver that receives the output optical signal, a polarizer that receives the received output optical signal and extracts a plurality of polarization modulated optical control signals therefrom, and means for converting the polarization modulated optical signals into electric signals and passing the electric signals through band-pass filters to obtain the plurality of control signals.

* * * * *